(12) United States Patent
Kobayashi et al.

(10) Patent No.: US 7,990,440 B2
(45) Date of Patent: Aug. 2, 2011

(54) IMAGE SENSING APPARATUS AND IMAGING SYSTEM

(75) Inventors: Hideo Kobayashi, Ebina (JP);
Tetsunobu Kochi, Hiratsuka (JP);
Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/267,842

(22) Filed: Nov. 10, 2008

(65) Prior Publication Data

US 2009/0141157 A1 Jun. 4, 2009

(30) Foreign Application Priority Data

Dec. 4, 2007 (JP) ................................. 2007-313951

(51) Int. Cl.
*H04N 5/217* (2006.01)
(52) U.S. Cl. ........................ 348/241; 348/300; 348/302
(58) Field of Classification Search .................. 348/241, 348/300–305, 308, 312, 316, 272, 273, 280–282, 348/294; 257/223, 224; 250/208.1
See application file for complete search history.

(56) References Cited

U.S. PATENT DOCUMENTS

| | | | |
|---|---|---|---|
| 6,670,990 B1 | 12/2003 | Kochi et al. | 348/310 |
| 6,717,151 B2 | 4/2004 | Tashiro et al. | 250/370.11 |
| 6,747,700 B1 * | 6/2004 | Funakoshi et al. | 348/308 |
| 6,784,928 B1 * | 8/2004 | Sakurai et al. | 348/220.1 |
| 6,800,836 B2 | 10/2004 | Hamamoto et al. | 250/208.1 |
| 6,956,605 B1 * | 10/2005 | Hashimoto | 348/301 |
| 7,016,089 B2 | 3/2006 | Yoneda et al. | 358/482 |
| 7,110,030 B1 | 9/2006 | Kochi et al. | 348/308 |
| 7,135,668 B2 | 11/2006 | Kochi et al. | 250/214 R |
| 7,148,927 B2 * | 12/2006 | Ogura et al. | 348/281 |
| 7,221,397 B1 | 5/2007 | Kochi | 348/310 |
| 7,286,170 B2 * | 10/2007 | Inui et al. | 348/241 |
| 7,423,790 B2 | 9/2008 | Kochi et al. | 358/513 |
| 7,554,591 B2 * | 6/2009 | Kikuchi et al. | 348/308 |
| 2006/0169871 A1 | 8/2006 | Kochi | 250/208.1 |
| 2007/0279503 A1 | 12/2007 | Totsuka | 348/283 |
| 2009/0207293 A1 * | 8/2009 | Ryoki et al. | 348/308 |

FOREIGN PATENT DOCUMENTS

JP 2004-153682 A 5/2004

* cited by examiner

*Primary Examiner* — Lin Ye
*Assistant Examiner* — Chriss S Yoder, III
(74) *Attorney, Agent, or Firm* — Fitzpatrick, Cella, Harper & Scinto

(57) ABSTRACT

An image sensing apparatus includes an output unit including a first output line which transmits a first signal of the first pixel, a second output line which transmits a second signal of the first pixel, a third output line which transmits a first signal of the second pixel, a fourth output line which transmits a second signal of the second pixel, a first difference circuit which operates the difference between the first signal and the second signal of the first pixel to generate a first image signal, and a second difference circuit which operates the difference between the first signal and the second signal of the second pixel to generate a second image signal, wherein the first output line is arranged between the third output line and the fourth output line, and the third output line is arranged between the first output line and the second output line.

12 Claims, 8 Drawing Sheets

IMAGE SENSING APPARATUS AND IMAGING SYSTEM

BACKGROUND OF THE INVENTION

1. Field of the Invention

The present invention relates to an image sensing apparatus and an imaging system.

2. Description of the Related Art

An image sensing apparatus such as a MOS sensor includes a pixel array in which a plurality of pixels are arrayed, a readout unit which reads out a signal from the pixel array and outputs a plurality of signals, and an output unit which obtains an image signal in accordance with the plurality of signals output from the readout unit and outputs it. The output unit performs correlated double sampling (to be abbreviated as CDS hereinafter) processing.

The readout unit reads out an optical signal and noise signal from the pixel of each column of the pixel array at different timings, and temporarily holds them in a line memory. The readout unit outputs the optical signal and noise signal held in the line memory to an optical signal output line (to be referred to as an S output line hereinafter) and a noise signal output line (to be referred to as an N output line hereinafter) in the output unit. The readout unit sequentially performs this operation for respective columns.

In the output unit, a difference circuit arranged at the succeeding stage of the S output line and N output line operates the difference between the optical signal transferred to the S output line and the noise signal transferred to the N output line (performs CDS processing), thereby sequentially obtaining image signals of the pixels of each column.

A case in which an optical signal and noise signal of the pixel of the first column are output to a first S output line and first N output line, and an optical signal and noise signal of the pixel of the second column are output to a second S output line and second N output line will be considered. In this case, a first difference circuit operates the difference between the optical signal output to the first S output line and the noise signal output to the first N output line (performs CDS processing), thereby obtaining an image signal of the pixel of the first column. A second difference circuit operates the difference between the optical signal output to the second S output line and the noise signal output to the second N output line (performs CDS processing), thereby obtaining an image signal of the pixel of the second column. With this arrangement, operations involved in the optical signals and noise signals of the first and second columns can be performed parallelly. This makes it possible to increase the operating speed of the output unit.

In this arrangement, the first S output line and first N output line correspond to the pixels of the first column, and the second S output line and second N output line correspond to the pixels of the second column. For this reason, it is a common practice to arrange the first S output line, first N output line, second S output line, and second N output line in this order. In this case, the first N output line is adjacent to the second S output line, so it is readily susceptible to crosstalk according to an optical signal by the second S output line.

To solve this problem, Japanese Patent Laid-Open No. 2004-153682 discloses an image sensing apparatus in which two pairs of N output lines and S output lines, i.e., a first S output line, first N output line, second N output line, and second S output line are arranged in this order. With this arrangement, the first N output line is adjacent to the second N output line, so it is susceptible to crosstalk according to a noise signal, a temporal change in level of which is smaller than that of an optical signal, by the second N output line. This makes it possible to reduce noise attributed to crosstalk on the first N output line, according to Japanese Patent Laid-Open No. 2004-153682.

In the arrangement disclosed in Japanese Patent Laid-Open No. 2004-153682, i.e., the arrangement in which the first S output line, first N output line, second N output line, and second S output line are arranged in this order, the smaller the spacings between the output lines, the shorter the distances between the first S output line and the second S output line and between the first N output line and the second S output line. This may increase crosstalk inflicted on the first S output line and first N output line by the second S output line. Furthermore, the distance between the first N output line and the second S output line is different from that between the first S output line and the second S output line. For this reason, noise attributed to crosstalk inflicted on the first N output line by the second S output line is more likely to be different from that attributed to crosstalk inflicted on the first S output line by the second S output line. In this case, even when the first difference circuit operates the difference between the signal output to the first S output line and that output to the first N output line, it is impossible to reduce noise attributed to crosstalk. That is, it is difficult to reduce noise attributed to crosstalk inflicted on the first S output line and first N output line by the second S output line.

SUMMARY OF THE INVENTION

The present invention provides for reducing noise attributed to crosstalk even when the spacings between a plurality of output lines which parallelly transmit a plurality of signals of a plurality of pixels are decreased.

According to the first aspect of the present invention, there is provided an image sensing apparatus comprising: a pixel array in which a plurality of pixels including a first pixel and a second pixel are arrayed; a readout unit which reads out a signal from the pixel array and outputs a plurality of signals; and an output unit, wherein the output unit including a first output line which transmits a first signal of the first pixel, which is output from the readout unit, a second output line which transmits a second signal of the first pixel, which is output from the readout unit, a third output line which transmits a first signal of the second pixel, which is output from the readout unit, a fourth output line which transmits a second signal of the second pixel, which is output from the readout unit, a first difference circuit which operates a difference between the first signal and the second signal of the first pixel to generate a first image signal, and a second difference circuit which operates a difference between the first signal and the second signal of the second pixel to generate a second image signal, and wherein the first output line is arranged between the third output line and the fourth output line, and the third output line is arranged between the first output line and the second output line.

According to the second aspect of the present invention, there is provided an imaging system comprising: an image sensing apparatus according to the first aspect of the present invention; an optical system which forms an image on an image sensing plane of the image sensing apparatus; and a signal processing unit which processes the signal output from the image sensing apparatus to generate image data.

According to the present invention, it is possible to reduce noise attributed to crosstalk even when the spacings between a plurality of output lines which parallelly transmit a plurality of signals of a plurality of pixels are decreased.

Further features of the present invention will become apparent from the following description of exemplary embodiments with reference to the attached drawings.

DESCRIPTION OF THE EMBODIMENTS

Figure 1:
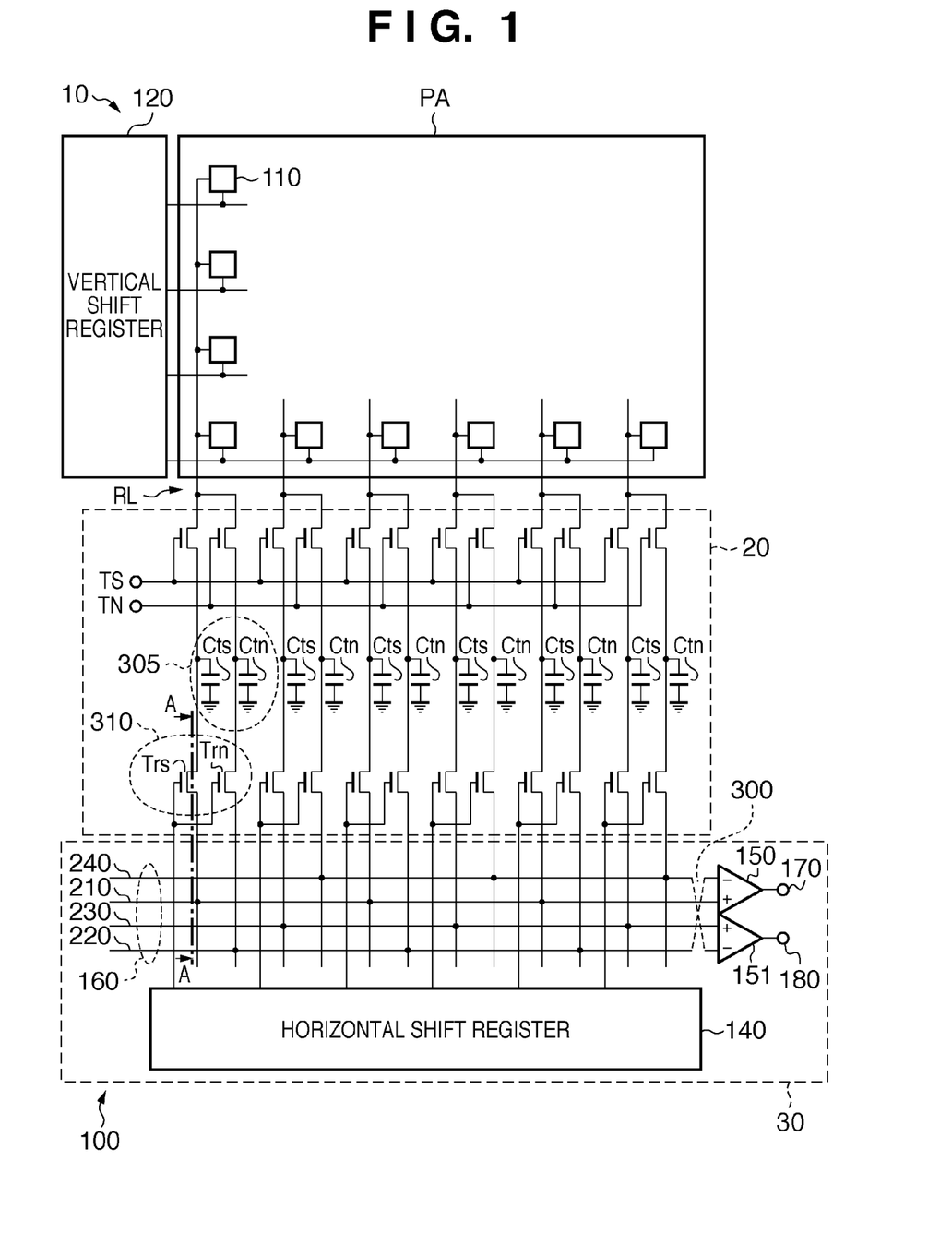
FIG. 1 is a circuit diagram showing the arrangement of an image sensing apparatus 100 according to the first embodiment of the present invention.
Figure 2:
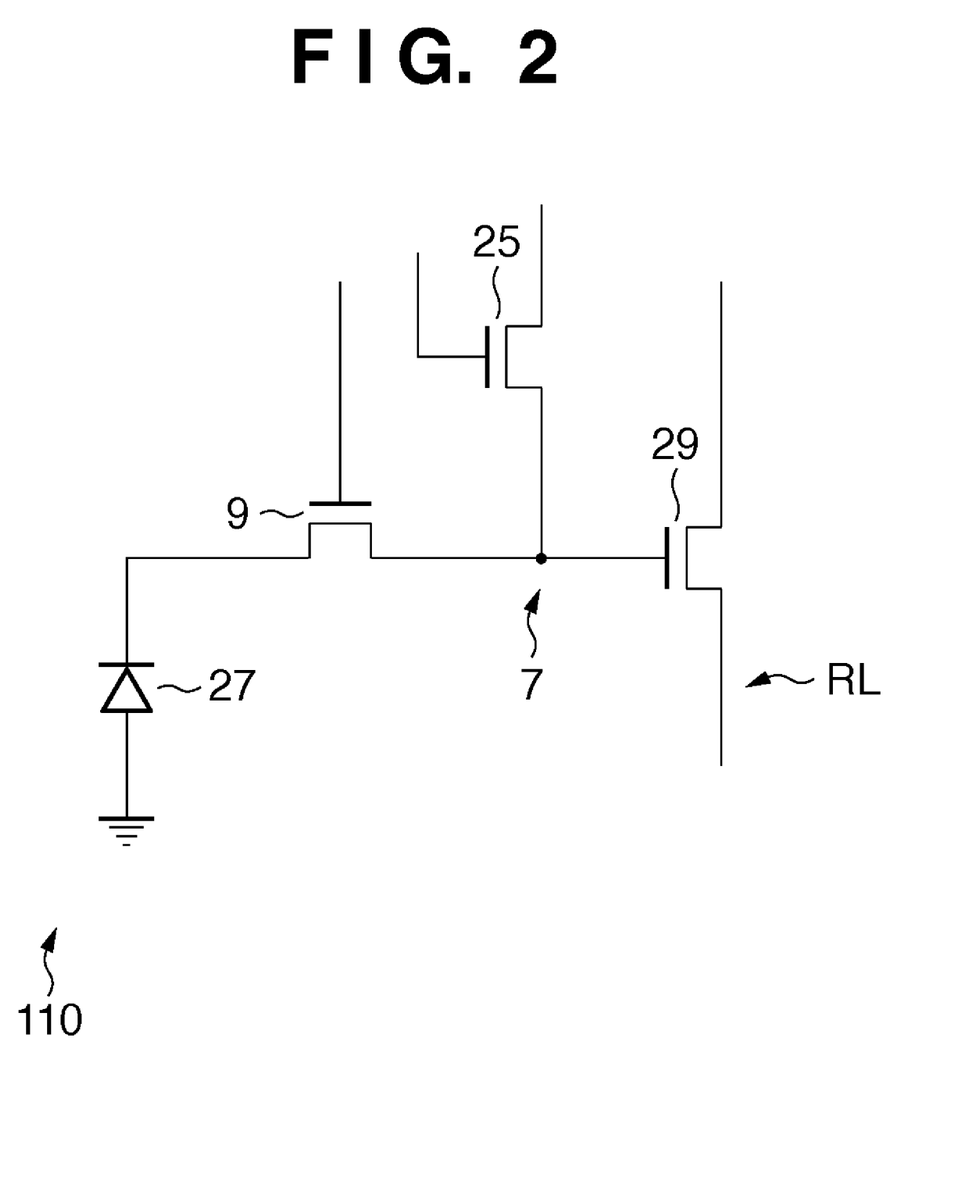
FIG. 2 is a partial circuit diagram showing the arrangement of a pixel.

An image sensing apparatus 100 according to the first embodiment of the present invention will be described with reference to FIGS. 1 and 2. FIG. 1 is a circuit diagram showing the arrangement of the image sensing apparatus 100 according to the first embodiment of the present invention. FIG. 2 is a partial circuit diagram showing the arrangement of a pixel.

The image sensing apparatus 100 includes a pixel array PA, selection unit 10, readout unit 20, and output unit 30, as shown in FIG. 1.

In the pixel array PA, a plurality of pixels 110 are arrayed two-dimensionally (in the row and column directions). Each pixel 110 includes a reset transistor 25, a photoelectric conversion unit 27, a transfer gate 9, a floating diffusion node (to be abbreviated as an FD node hereinafter) 7, and an amplification transistor 29, as shown in FIG. 2. The reset transistor 25 resets the FD node 7. The photoelectric conversion unit 27 generates an electric charge (signal) according to the incident light by photoelectric conversion, and accumulates it. An example of the photoelectric conversion unit 27 is a photodiode. The transfer gate 9 transfers the electric charge (signal) accumulated by the photoelectric conversion unit 27 to the FD node 7. The FD node 7 converts the electric charge (signal) into a voltage (signal). The amplification transistor 29 amplifies the signal input from the FD node 7, and outputs the amplified signal to a column signal line RL. That is, the amplification transistor 29 amplifies a noise signal according to the signal input from the FD node 7, and outputs the amplified signal to the column signal line RL, while the FD node 7 has been reset by the reset transistor 25. The amplification transistor 29 also amplifies an optical signal according to the signal input from the FD node 7, and outputs the amplified signal to the column signal line RL, while the electric charge generated by the photoelectric conversion unit 27 has been transferred to the FD node 7 by the transfer gate 9. In this way, a signal (i.e., a noise signal or optical signal) is read out from the pixel 110.

The following description will be given assuming that numbers are assigned to the columns of the pixel array PA in ascending order from the upper left corner to the lower right corner in FIG. 1. In the pixel array PA, a plurality of pixels 110 may be arrayed one-dimensionally.

The selection unit 10 selects a region (row) of pixels from which signals are to be read out in the pixel array PA. The selection unit 10 includes a vertical shift register circuit 120. The vertical shift register circuit 120 sequentially selects the rows of the pixels 110 from the pixel array PA by, e.g., a shift operation.

The readout unit 20 reads out signals from the pixels of the region (row) selected by the selection unit 10 in the pixel array PA. The readout unit 20 includes line memory circuits 305 and transfer circuits 310.

The line memory circuit 305 includes a signal charge holding capacitance Cts and noise signal holding capacitance Ctn for each column of the pixel array PA. The signal charge holding capacitance Cts holds an optical signal (first signal) read out from the pixel 110 of each column in the selected row. The noise signal holding capacitance Ctn holds a noise signal (second signal) read out from the pixel 110 of each column in the selected row. Note that the optical signal is a signal in which the noise signal is superimposed on an image signal. The image signal is a signal accumulated by the photoelectric conversion unit 27. The noise signal is a signal according to fixed pattern noise such as an offset of a transistor in the pixel 110.

The transfer circuit 310 transfers the signals held in the line memory circuit 305 to an output line group 160. The transfer circuit 310 includes a signal transfer transistor Trs and noise transfer transistor Trn for each column of the pixel array PA in correspondence with the signal charge holding capacitance Cts and noise signal holding capacitance Ctn.

The output unit 30 includes a horizontal shift register circuit 140, the output line group 160, a first difference circuit 150, and a second difference circuit 151.

The horizontal shift register circuit 140 controls the transfer circuit 310 to sequentially transfer the signals of respective columns held in the line memory circuit 305 to the output line group 160 on an every two-column basis. For example, the horizontal shift register circuit 140 transfers optical signals and noise signals of the pixels of the first and second columns held in the line memory circuit 305 to the output line group 160, and then transfers optical signals and noise signals of the pixels of the third and fourth columns to the output line group 160.

The signals held in the line memory circuit 305 are transferred to the output line group 160. That is, optical signals and noise signals are sequentially output from the pixels of respective columns in the row selected by the selection unit 10 to the output line group 160 on an every two-column basis.

The output line group 160 includes a first S output line (first output line) 210, first N output line (second output line 220), second S output line (third output line) 230, and second N output line (fourth output line) 240.

An optical signal is output from a first pixel (e.g., the pixel of the first column in the row selected by the selection unit 10) in the pixel array PA to the first S output line 210. The first S output line 210 transmits the optical signal of the first pixel, which is output from the readout unit 20.

The first N output line 220 is arranged parallel to the first S output line 210. A noise signal is output from the first pixel in the pixel array PA to the first N output line 220. The first N output line 220 transmits the noise signal of the first pixel, which is output from the readout unit 20.

The second S output line 230 is arranged between the first S output line 210 and first N output line 220 to be parallel to them. An optical signal is output from a second pixel (e.g., the pixel of the second column in the row selected by the selection unit 10) in the pixel array PA to the second S output line 230. The second S output line 230 transmits the optical signal of the second pixel, which is output from the readout unit 20.

The second N output line 240 is arranged parallelly adjacent to the first S output line 210 on the opposite side of the second S output line 230. A noise signal is output from the second pixel in the pixel array PA to the second N output line 240. The second N output line 240 transmits the noise signal of the second pixel, which is output from the readout unit 20.

Note that an optical signal output line is expressed as an S output line, and a noise signal output line is expressed as an N output line. The first S output line 210, first N output line 220, second S output line 230, and second N output line 240 form a wiring intersection portion 300 in which they intersect with each other immediately before the first difference circuit 150 and second difference circuit 151.

The first difference circuit 150 operates the difference between the signal output to the first S output line 210 and that output to the first N output line 220. That is, the first difference circuit 150 operates and amplifies the difference between the optical signal from the first S output line 210 and the noise signal from the first N output line 220 to obtain a first image signal, and outputs it via an output terminal 170 to the succeeding stage.

The second difference circuit 151 operates the difference between the signal output to the second S output line 230 and that output to the second N output line 240. That is, the second difference circuit 151 operates and amplifies the difference between the optical signal from the second S output line 230 and the noise signal from the second N output line 240 to obtain a second image signal, and outputs it via an output terminal 180 to the succeeding stage.

Figure 3:
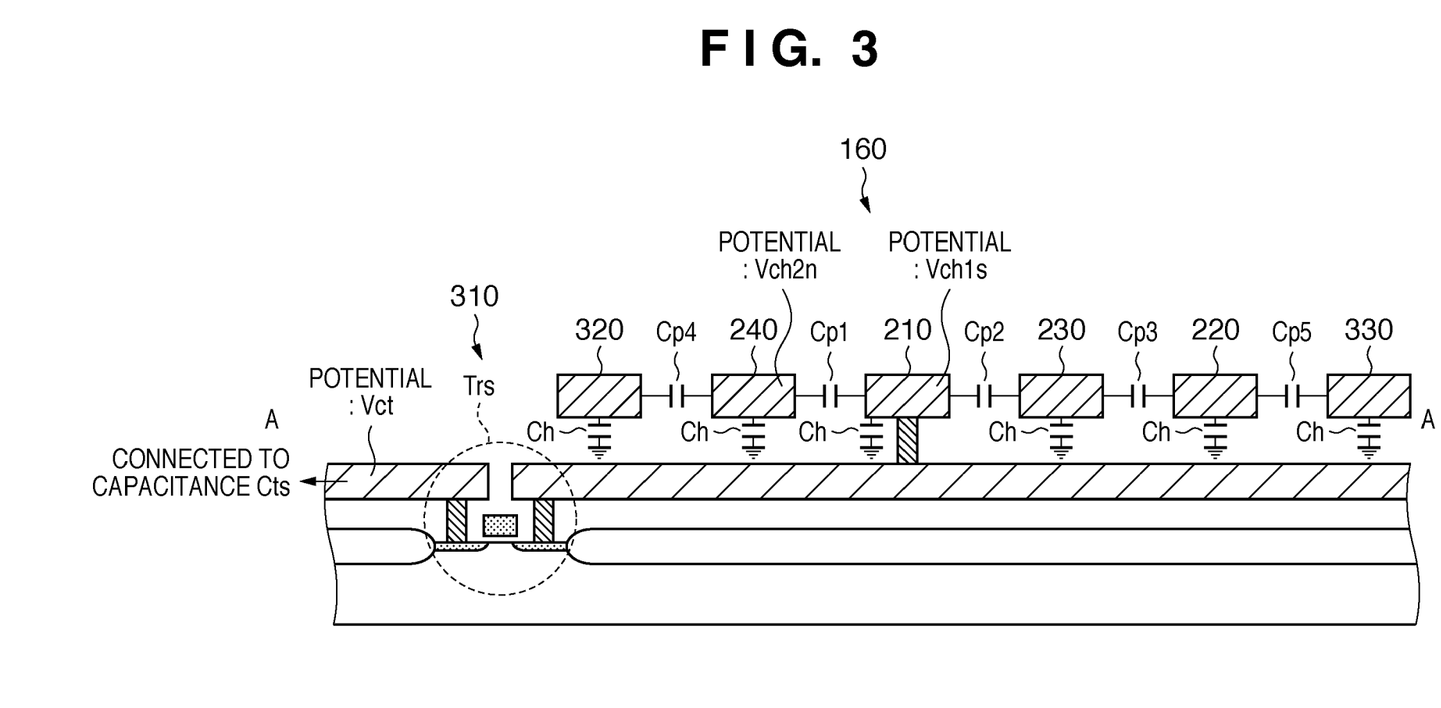
FIG. 3 is a sectional view for explaining crosstalk that acts between output lines in an output line group.

Crosstalk that acts between the output lines in the output line group will be explained next with reference to FIG. 3. FIG. 3 is a sectional view taken along the line A-A of a structure corresponding to the circuit diagram shown in FIG. 1.

The output lines 210 to 240 in the output line group 160 are made of a metal and form parasitic capacitances Ch with ground level, as shown in FIG. 3. Insulating materials (interlayer films) are inserted between the output lines 210 to 240 so that they are insulated from each other. Coupling capacitances Cp1 to Cp3 are formed between the output lines 210 to 240. The magnitudes of crosstalk components between the output lines 210 to 240 depend on the coupling capacitances Cp1 to Cp3. The smaller the spacings between the output lines 210 to 240, the greater the magnitudes of crosstalk components between the output lines 210 to 240.

Note that a noise signal (second signal), a temporal change in level of which is smaller than an optical signal (first signal), is output to the first N output line 220 or second N output line 240. A temporal change in crosstalk that the first S output line 210 and second S output line 230 inflict on other output lines is larger than that in crosstalk that the first N output line 220 and second N output line 240 inflict on other output lines. As compared to crosstalk a temporal change of which is relatively small, crosstalk a temporal change of which is relatively large inflicts a great influence on the output lines. That is, crosstalk that the S output lines of the output lines 210 to 240 inflict on other output lines is especially problematic. In other words, whether crosstalk is problematic depends on the distances from the S output lines.

For example, in the arrangement disclosed in Japanese Patent Laid-Open No. 2004-153682, i.e., the arrangement in which the first S output line, first N output line, second N output line, and second S output line are arranged in this order, the smaller the spacings between the output lines, the shorter the distances between the first S output line and the second S output line and between the first N output line and the second S output line. This may increase crosstalk inflicted on the first S output line and first N output line by the second S output line. In this case, in the arrangement disclosed in Japanese Patent Laid-Open No. 2004-153682, the distance between the first N output line and the second S output line is often shorter than that between the first S output line and the second S output line. With this arrangement, noise (indicated by, e.g., CN1N) attributed to crosstalk inflicted on the first N output line by the second S output line is larger than noise (indicated by, e.g., CN1S) attributed to crosstalk inflicted on the first S output line by the second S output line. Consequently, the first difference circuit 150 cannot reduce noise attributed to crosstalk in obtaining a first image signal DS1, as can be seen from:

$$CN1S < CN1N \tag{1}$$

$$DS1 = |\{(\text{optical signal}) + CN1S\} - \{(\text{noise signal}) + CN1N\}| \tag{2}$$
$$= |(\text{optical signal}) - (\text{noise signal}) + (CN1S - CN1N)|$$

In contrast, the second S output line 230 is arranged between the first S output line 210 and the first N output line 220 to be parallel to them in this embodiment. With this arrangement, noise components attributed to crosstalk inflicted on the first S output line and first N output line by the second S output line can be adjusted to have an equal magnitude (indicated by, e.g., CN1) even when they increase upon decreasing the spacings between the output lines. Consequently, the first difference circuit 150 can reduce noise attributed to crosstalk in obtaining a first image signal DS1, as can be seen from:

$$CN1S = CN1N = CN1 \tag{3}$$

$$DS1 = |\{(\text{optical signal}) + CN1S\} - \{(\text{noise signal}) + CN1N\}| \tag{4}$$
$$= |(\text{optical signal}) - (\text{noise signal}) + (CN1 - CN1)|$$
$$= |(\text{optical signal}) - (\text{noise signal})|$$

Likewise, the first S output line 210 is arranged between the second S output line 230 and the second N output line 240 to be parallel to them. With this arrangement, noise components attributed to crosstalk inflicted on the second S output line and second N output line by the first S output line can be adjusted to have an equal magnitude (indicated by, e.g., CN2) even when they increase upon decreasing the spacings between the output lines. Consequently, the second difference circuit 151 can reduce noise attributed to crosstalk in obtaining a second image signal DS2, as can be seen from:

$$CN2S = CN2N = CN2 \tag{5}$$

$$DS2 = |\{(\text{optical signal}) + CN2S\} - \{(\text{noise signal}) + CN2N\}| \tag{6}$$
$$= |(\text{optical signal}) - (\text{noise signal}) + (CN2 - CN2)|$$
$$= |(\text{optical signal}) - (\text{noise signal})|$$

In this manner, according to this embodiment, it is possible to reduce noise attributed to crosstalk even when the spacings between a plurality of output lines which parallelly transmit a plurality of signals of a plurality of pixels are decreased. It is therefore possible to suppress the adverse influence of crosstalk even when the chip size of the image sensing apparatus is reduced.

The signal transfer transistor Trs of the transfer circuit 310 has its source connected to the first S output line 210, and its drain connected to the signal charge holding capacitance Cts, as shown in FIG. 3. A first shield line 320 and second shield line 330 (neither of which are shown in FIG. 1) are arranged at positions adjacent to the outside of the output line group 160 to be parallel to the output lines 210 to 240. The first shield line 320 is adjacent to the second N output line 240 to form a coupling capacitance Cp4 with the second N output line 240. The second shield line 330 is adjacent to the first N output line 220 to form a coupling capacitance Cp5 with the first N output line 220.

To clarify the effect of the present invention, the way an electric charge is injected into the second N output line 240 and the second S output line 230 due to crosstalk from the first S output line 210 to the second N output line 240 via the coupling capacitance Cp1 and thereby signals transmitted by the second N output line 240 and the second output line 230 changes will be explained quantitatively.

Referring to FIG. 3, let Vch1$s$ be the potential of the first S output line 210, Vch2$n$ be the potential of the second N output line 240, and Vct be the potential of the signal charge holding capacitance Cts. The coupling capacitance Cp1 between the first S output line 210 and the second N output line 240 is assumed to be a×Ch ('a' is a positive number representing the ratio of Cp1 to Ch). The coupling capacitance Cp2 between the first S output line 210 and the second S output line 230 is assumed to be b×Ch ('b' is a positive number representing the ratio of Cp2 to Ch). The coupling capacitance Cp3 between the second S output line 230 and the first N output line 220 is assumed to be c×Ch ('c' is a positive number representing the ratio of Cp3 to Ch). The coupling capacitance Cp4 between the second N output line 240 and the first shield line 320 is assumed to be d×Ch ('d' is a positive number representing the ratio of Cp4 to Ch).

When the signal transfer transistor Trs of the transfer circuit 310 is OFF, Vct=Vs, Vch2$n$=0, and Vch1$s$=0.

When a signal is output to the first S output line 210 upon turning on the signal transfer transistor Trs of the transfer circuit 310, the potential of the first S output line 210 becomes Vct=Vch1$s$. In this state, when Vct=Vch1$s$=V1, the potential of the first S output line 210 is given by:

$$V1 = (Cts/[Cts + \{1 + a/(1+a) + b/(1+b)\}Ch]) \times Vs \quad (7)$$

When Vch1$s$ increases from 0 to V1 expressed by equation (7), Vch2$n$ increases due to crosstalk from the first S output line 210 to the second N output line 240. An amount V2 of increase in the potential of the second N output line 240 is given by:

$$V2 = [a/\{1 + a/(1+a) + d/(1+d)\}] \times V1 \quad (8)$$

In other words, a change in the potential of the second N output line 240 due to crosstalk from the first S output line 210 is given by equation (8).

Likewise, a change V3 in the potential of the second S output line 230 due to crosstalk from the first S output line 210 is given by:

$$V3 = [b/\{1 + b/(1+b) + c/(1+c)\}] \times V1 \quad (9)$$

Assuming that the gain of the second difference circuit 151 is A, and its common mode ratio is sufficiently large, a crosstalk component ΔCN in the second image signal DS2 is given by:

$$\Delta CN = V3 - V2 = A[b/\{1 + b/(1+b) + c/(1+c)\} - a/\{1 + a/(1+a) + d/(1+d)\}] \times V1 \quad (10)$$

When, for example, the image sensing apparatus 100 is designed to satisfy a≅b≅c≅d by setting the difference among the coupling capacitances Cp1, Cp2, Cp3, and Cp4 to be sufficiently small in FIG. 3, ACN in equation (10) becomes nearly zero. This makes it possible to sufficiently reduce the crosstalk component in the second image signal. The difference among the coupling capacitances can be sufficiently decreased by equalizing, e.g., the wiring widths of the output lines and the distances between the wiring lines as much as possible.

The same applies to crosstalk from the second S output line 230 to the first N output line line 220 and the first S output line 210.

Figure 4:
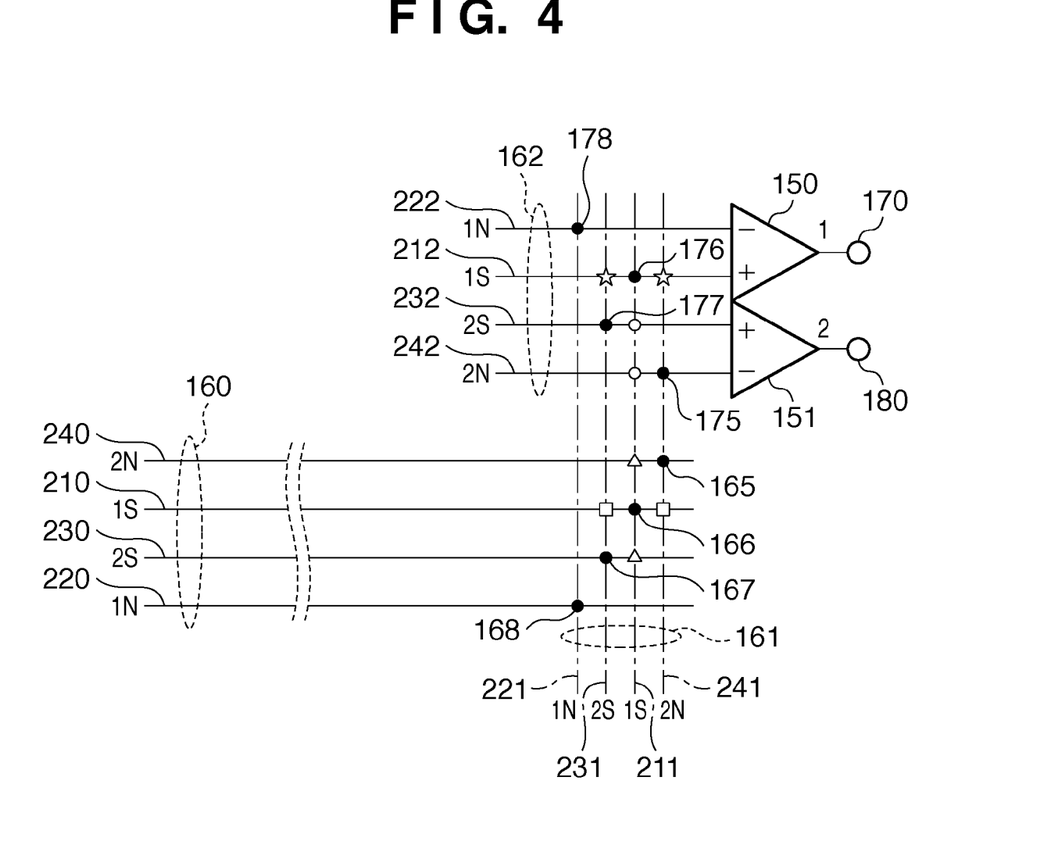
FIG. 4 is a diagram showing an example of the detailed layout pattern of a wiring intersection portion 300.

An example of the layout pattern of the wiring intersection portion 300 will be explained next with reference to FIG. 4. FIG. 4 is a diagram showing an example of the detailed layout pattern of the wiring intersection portion 300 shown in FIG. 1.

The output line group (first wiring layer) 160 is connected to a second wiring layer 161 via wiring lines 165 to 168 (indicated by the filled circles in FIG. 4). The second wiring layer 161 is connected to a third wiring layer 162 via wiring lines 175 to 178 (indicated by the filled circles in FIG. 4). The third wiring layer 162 is connected to the first difference circuit 150 and second difference circuit 151.

The second wiring layer 161 includes a first S communication line 211, first N communication line 221, second S communication line 231, and second N communication line 241. The first S communication line 211 communicates the first S output line 210 and first difference circuit 150 via the via wiring line 166. The first N communication line 221 communicates the first N output line 220 and first difference circuit 150 via the via wiring line 168. The second S communication line 231 communicates the second S output line 230 and second difference circuit 151 via the via wiring line 167. The second N communication line 241 communicates the second N output line 240 and second difference circuit 151 via the via wiring line 165.

The third wiring layer 162 includes a first S connection line 212, first N connection line 222, second S connection line 232, and second N connection line 242. The first S connection line 212 connects the first S communication line 211 and first difference circuit 150 via the via wiring line 176. The first N connection line 222 connects the first N communication line 221 and first difference circuit 150 via the via wiring line 178. The second S connection line 232 connects the second S communication line 231 and second difference circuit 151 via the via wiring line 177. The second N connection line 242 connects the second N communication line 241 and second difference circuit 151 via the via wiring line 175.

Note that the first S output line 210, first S communication line 211, and first S connection line 212 inflict crosstalk on other output lines, communication lines, and connection lines at portions where they intersect with the other output lines, communication lines, and connection lines.

For example, the first S output line 210 intersects with each of the second S communication line 231 and second N communication line 241 at one point (indicated by the open squares in FIG. 4). The first S communication line 211 intersects with each of the second S output line 230 and second N output line 240 at one point (indicated by the open triangles in FIG. 4), and intersects with each of the second S connection line 232 and second N connection line 242 at one point (indicated by the open circles in FIG. 4). The first S connection line 212 intersects with each of the second S communication line 231 and second N communication line 241 at one point (indicated by the open stars). That is, the paths (first S output line 210, first S communication line 211, and first S connection line 212) through which an optical signal of the first pixel is transmitted intersect with those, through which an optical signal and noise signal of the second pixel are transmitted, via interlayer films at an equal number of points. In this case, crosstalk components inflicted on portions where the paths through which an optical signal of the first pixel is transmitted intersect with those through which an optical signal and noise signal of the second pixel are transmitted can be an equal magnitude.

Likewise, the paths through which an optical signal of the second pixel intersect with those, through which an optical signal and noise signal of the first pixel are transmitted, via interlayer films at an equal number of points. In this case, crosstalk components inflicted on portions where the paths through which an optical signal and noise signal of the first pixel are transmitted intersect with those through which an optical signal of the second pixel is transmitted can be an equal magnitude.

A clamp circuit (not shown; an arithmetic operation unit) and a column amplifier (not shown; an amplification unit) may be additionally inserted between the pixels of each column of the pixel array PA and the line memory circuit 305 of the corresponding column. In this case, the clamp circuit operates the difference between an optical signal (first signal) and noise signal (second signal) read out from the pixel of each column of the pixel array at different timings, thereby obtaining an image signal of the pixel of each column. The column amplifier is inserted between the output line group 160 and the clamp circuit. The column amplifier amplifies the image signal of the pixel of each column, which is obtained by the clamp circuit. With this operation, the signal charge holding capacitance Cts holds the first signal read out from the pixel 110 of each column in the selected row. The noise signal holding capacitance Ctn holds the second signal read out from the pixel 110 of each column in the selected row. The first signal is a signal in which an offset of the column amplifier is superimposed on the image signal. The second signal is an offset of the amplification unit. Because the second signal is output from the column amplifier in response to the readout of the noise signal (second signal) from the pixel, it can be said to be practically output from the pixel and can be referred to as a signal of the pixel.

Figure 5:
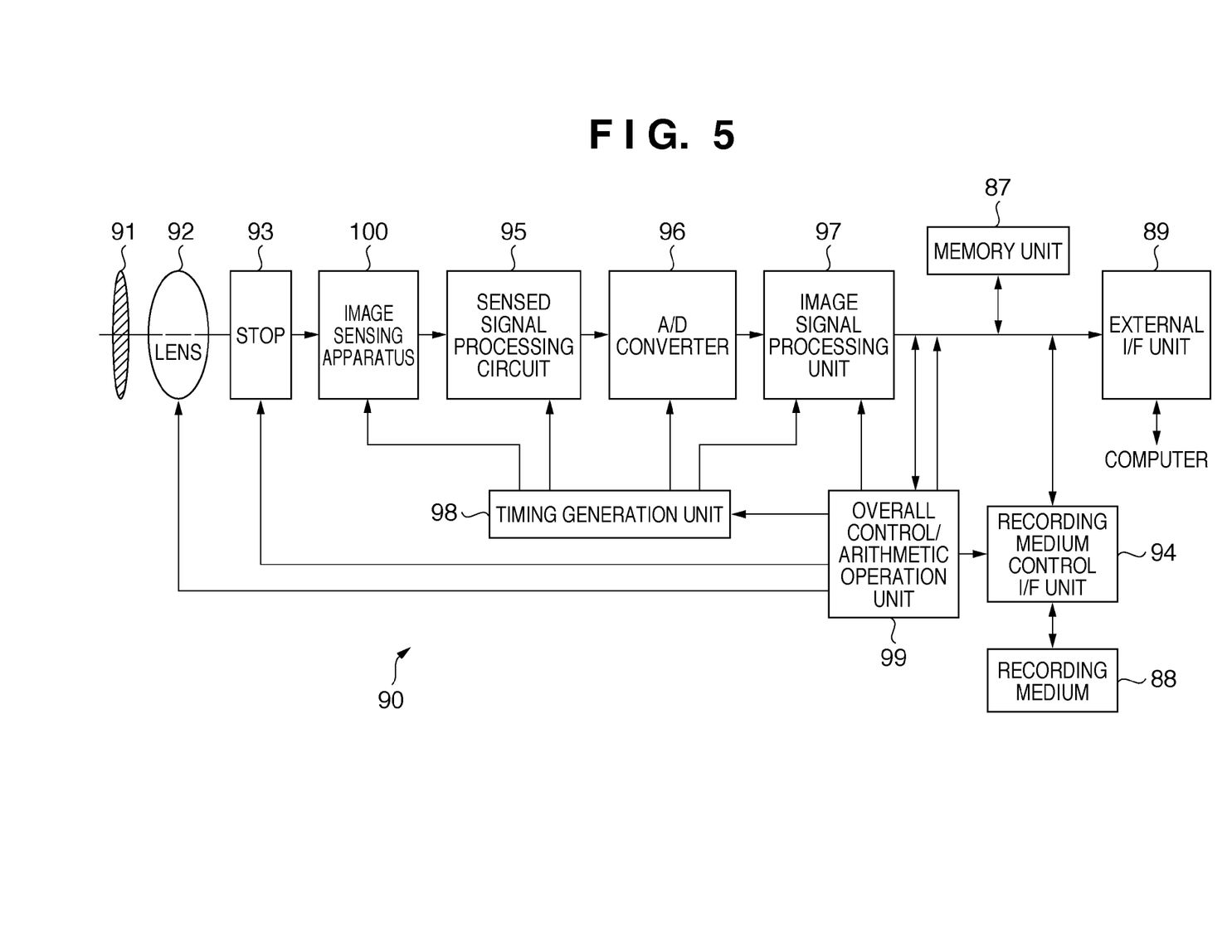
FIG. 5 is a block diagram showing the configuration of an imaging system to which the image sensing apparatus according to the first embodiment is applied.

FIG. 5 shows an example of an imaging system to which the image sensing apparatus according to the present invention is applied.

An imaging system 90 mainly includes an optical system, image sensing apparatus 100, and signal processing unit, as shown in FIG. 5. The optical system mainly includes a shutter 91, lens 92, and stop 93. The signal processing unit mainly includes a sensed signal processing circuit 95, A/D converter 96, image signal processing unit 97, memory unit 87, external I/F unit 89, timing generation unit 98, overall control/arithmetic operation unit 99, recording medium 88, and recording medium control I/F unit 94. The signal processing unit need not always include the recording medium 88.

The shutter 91 is inserted immediately before the lens 92 in the optical path, and controls exposure.

The lens 92 refracts the incident light to form an object image on the pixel array PA (image sensing plane) of the image sensing apparatus 100.

The stop 93 is inserted between the lens 92 and the image sensing apparatus 100 in the optical path, and adjusts the amount of light guided to the image sensing apparatus 100 upon passing through the lens 92.

The image sensing apparatus 100 converts the object image formed on the pixel array PA into an image signal. The image sensing apparatus 100 reads out the image signal from the pixel array, and outputs it.

The sensed signal processing circuit 95 is connected to the image sensing apparatus 100, and processes the image signal output from the image sensing apparatus 100.

The A/D converter 96 is connected to the sensed signal processing circuit 95, and converts the processed image signal (analog signal) output from the sensed signal processing circuit 95 into a digital signal.

The image signal processing unit 97 is connected to the A/D converter 96, and performs various types of arithmetic processing such as correction for the image signal (digital signal) output from the A/D converter 96 to generate image data. The image data is supplied to, e.g., the memory unit 87, external I/F unit 89, overall control/arithmetic operation unit 99, and recording medium control I/F unit 94.

The memory unit 87 is connected to the image signal processing unit 97, and stores the image data output from the image signal processing unit 97.

The external I/F unit 89 is connected to the image signal processing unit 97. With this arrangement, the image data output from the image signal processing unit 97 is transferred to external devices (e.g., a personal computer) via the external I/F unit 89.

The timing generation unit 98 is connected to the image sensing apparatus 100, sensed signal processing circuit 95, A/D converter 96, and image signal processing unit 97. With this arrangement, timing signals are supplied to the image sensing apparatus 100, sensed signal processing circuit 95, A/D converter 96, and image signal processing unit 97. The image sensing apparatus 100, sensed signal processing circuit 95, A/D converter 96, and image signal processing unit 97 operate in synchronism with the supplied timing signals.

The overall control/arithmetic operation unit 99 is connected to the timing generation unit 98, image signal processing unit 97, and recording medium control I/F unit 94, and systematically controls the image signal processing unit 97 and recording medium control I/F unit 94.

The recording medium 88 is detachably connected to the recording medium control I/F unit 94. With this arrangement, the image data output from the image signal processing unit 97 is recorded on the recording medium 88 via the recording medium control I/F unit 94.

With the above-described arrangement, a satisfactory image (image data) can be obtained as long as a satisfactory image signal can be obtained by the image sensing apparatus 100.

Figure 6:
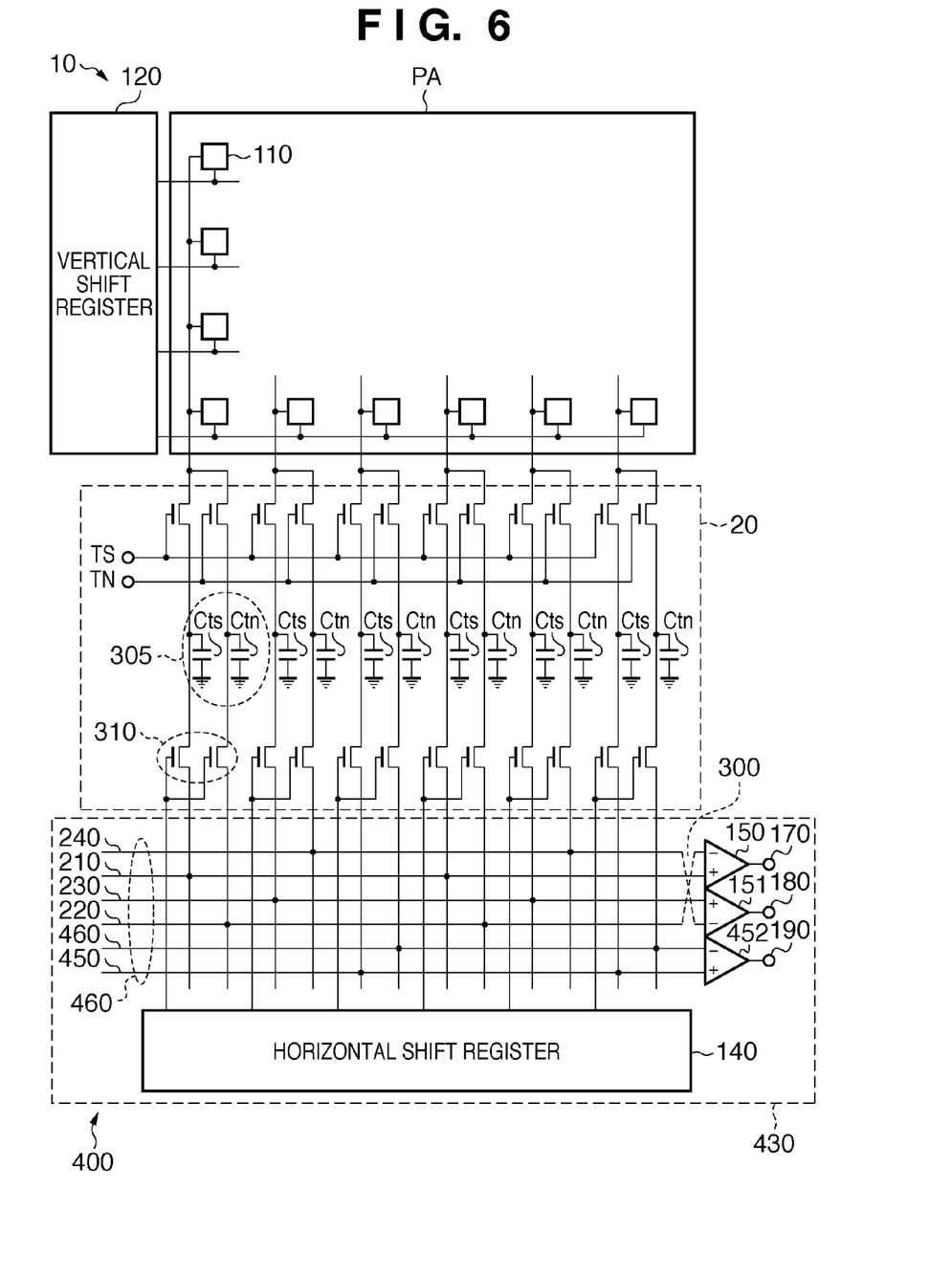
FIG. 6 is a circuit diagram showing the arrangement of an image sensing apparatus 400 according to the second embodiment of the present invention.

An image sensing apparatus 400 according to the second embodiment of the present invention will be described next with reference to FIG. 6. Points different from those in the first embodiment will be mainly described below, and a description of the same points will not be given.

The image sensing apparatus 400 includes an output unit 430. The output unit 430 includes an output line group 460 and third difference circuit 452.

Optical signals and noise signals are sequentially output from the pixels of respective columns in the row selected by a selection unit 10 to the output line group 460 on an every three-column basis. The output line group 460 additionally includes a third N output line (fifth output line) 461 and third S output line (sixth output line) 450.

The third N output line 461 is arranged between a first N output line 220 and the third S output line 450. The third N output line 461 is arranged parallelly adjacent to the first N output line 220 on the opposite side of a second S output line 230. A noise signal is output from a third pixel (e.g., the pixel of the third column in the row selected by the selection unit 10) in a pixel array PA to the third N output line 461. The third N output line 461 transmits the noise signal of the third pixel, which is output from a readout unit 20.

The third S output line 450 is arranged parallelly adjacent to the third N output line 461 on the opposite side of the first N output line 220. An optical signal is output from the third pixel in the pixel array PA to the third S output line 450. The third S output line 450 transmits the optical signal of the third pixel, which is output from the readout unit 20.

The third difference circuit 452 operates the difference between the signal output to the third N output line 461 and that output to the third S output line 450. That is, the third difference circuit 452 operates and amplifies the difference between the optical signal from the third S output line 450 and the noise signal from the third N output line 461 to obtain a third image signal, and outputs it from an output terminal 190 to the succeeding stage.

Note that not the third S output line 450 but the third N output line 461 is adjacent to the first N output line 220. This reduces the adverse influence of crosstalk that the third S output line 450 inflicts on other output lines.

Even in this embodiment, noise components attributed to crosstalk inflicted on the first S output line and first N output line by the second S output line can be an equal magnitude even when the spacings between the output lines are decreased. Also, noise components attributed to crosstalk inflicted on the second S output line and second N output line by the first S output line can be an equal magnitude even when the spacings between the output lines are decreased. It is therefore possible to reduce noise attributed to crosstalk that the first S output line and second S output line inflict on other output lines even when the spacings between a plurality of output lines which parallelly transmit a plurality of signals of a plurality of pixels are decreased.

A fourth N output line may be additionally arranged between the fourth S output line and a second N output line 240. In this case, not the fourth S output line (not shown) but the fourth N output line (not shown) is adjacent to the second N output line 240.

The fourth N output line is arranged between the second N output line 240 and the fourth S output line. The fourth N output line is arranged parallelly adjacent to the second N output line 240 on the opposite side of a first S output line 210. A noise signal is output from a fourth pixel (e.g., the pixel of the fourth column in the row selected by the selection unit 10) in the pixel array PA to the fourth N output line. The fourth N output line transmits the noise signal of the fourth pixel, which is output from the readout unit 20.

The fourth S output line is arranged parallelly adjacent to the fourth N output line on the opposite side of the second N output line 240. An optical signal is output from the fourth pixel in the pixel array PA to the fourth S output line. The fourth S output line transmits the optical signal of the fourth pixel, which is output from the readout unit 20.

A fourth difference circuit (not shown) operates the difference between the signal output to the fourth N output line and that output to the fourth S output line. That is, the fourth difference circuit operates and amplifies the optical signal from the fourth S output line and the noise signal from the fourth N output line to obtain a fourth image signal, and outputs it via an output terminal (not shown) to the succeeding stage.

Note that not the fourth S output line but the fourth N output line is adjacent to the second N output line 240. This reduces the adverse influence that the fourth S output line inflicts on other output lines.

Figure 7:
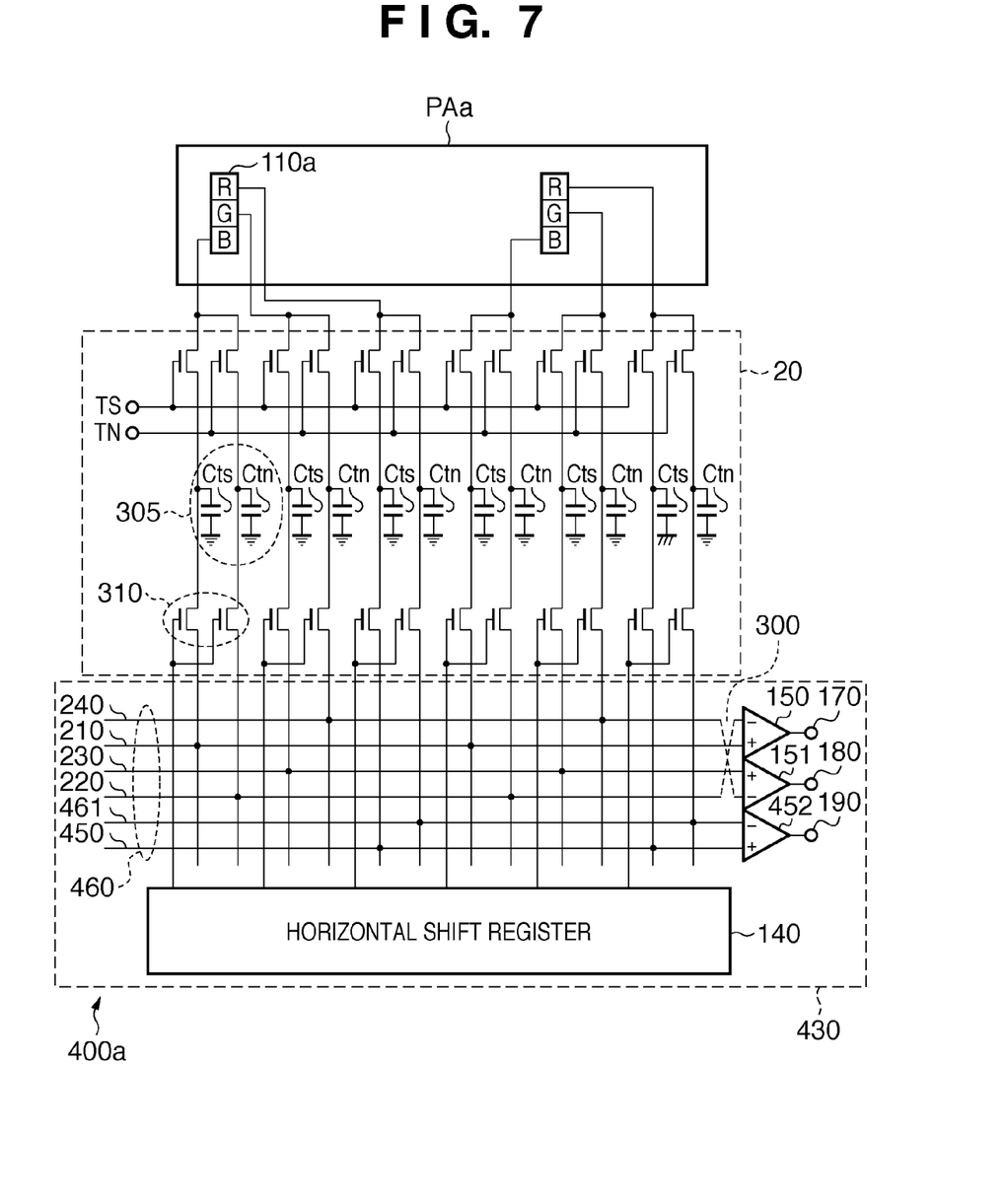
FIG. 7 is a circuit diagram showing the arrangement of an image sensing apparatus 400a according to a modification to the second embodiment of the present invention.

A pixel array PAa may include a plurality of columns of pixels 110a corresponding to R (red), G (green), and B (blue), as shown in FIG. 7. The first pixel which outputs signals to the first S output line 210 and first N output line 220 may be a pixel corresponding to a B (blue) color filter. The second pixel which outputs signals to the second S output line 230 and second N output line 240 may be a pixel corresponding to a G (green) color filter. The third pixel which outputs signals to the third S output line 450 and third N output line 461 may be a pixel corresponding to an R (red) color filter. In this case, crosstalk between the output lines is the one between different color components. The crosstalk between different color components changes the tone of an image, so it is likely to become conspicuous and problematic as compared to that between the same color components. With the same arrangement as that according to the second embodiment (see FIG. 7), it is possible to reduce noise attributed crosstalk between different color components, i.e., crosstalk that the first S output line and second S output line inflict on other output lines even when the spacings between a plurality of output lines which parallelly transmit a plurality of signals of a plurality of pixels are decreased.

Although FIG. 7 exemplifies primary color filters using R, G, and B components as the different color components, the present invention is not particularly limited to this arrangement. For example, the use of complementary color filters can produce the same effect, as a matter of course.

Figure 8:
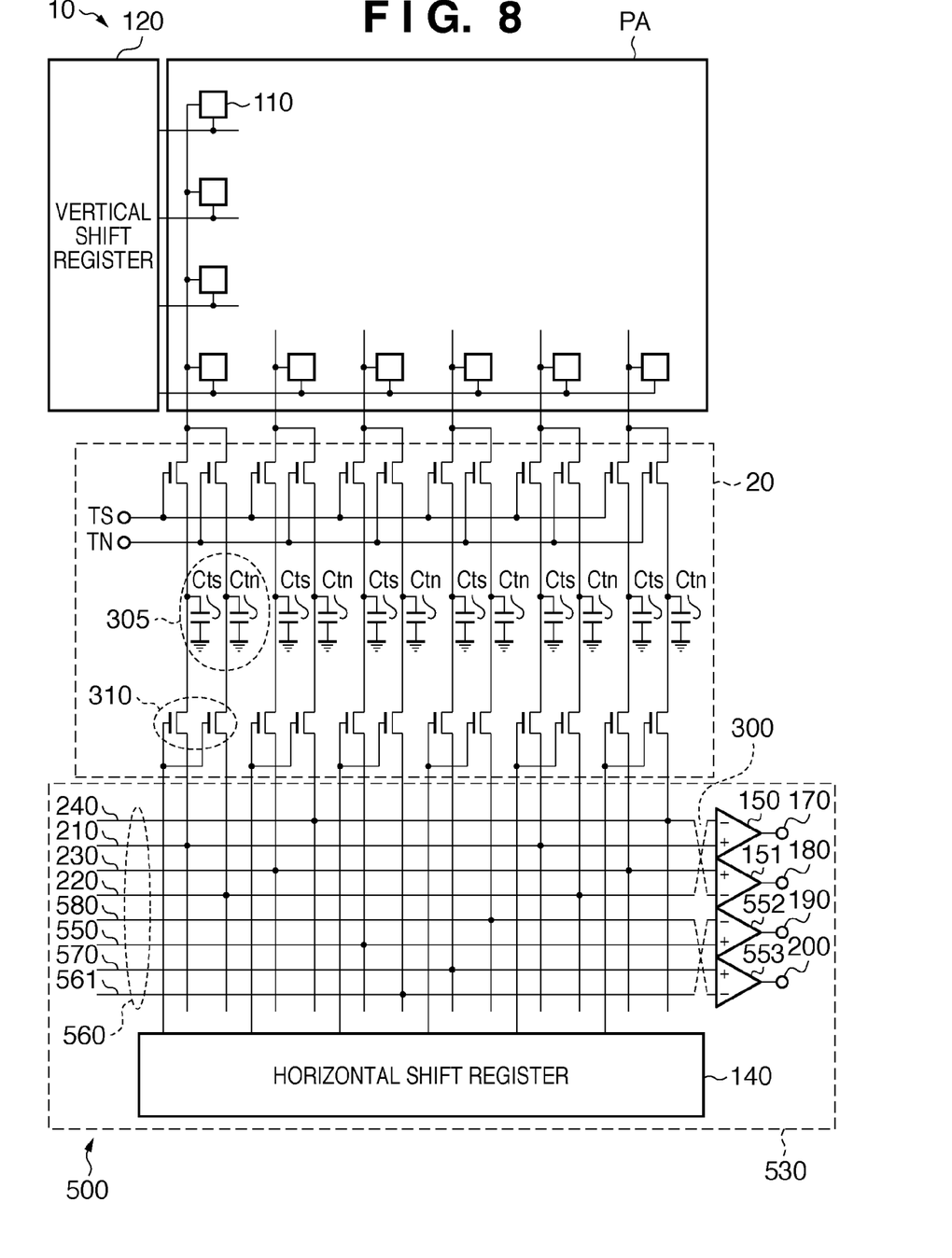
FIG. 8 is a circuit diagram showing the arrangement of an image sensing apparatus 500 according to the third embodiment of the present invention.

An image sensing apparatus 500 according to the third embodiment of the present invention will be described next with reference to FIG. 8. Points different from those in the first embodiment will be mainly described below, and a description of the same points will not be given.

The image sensing apparatus 500 includes an output unit 530. The output unit 530 includes an output line group 560, fourth difference circuit 552, and fifth difference circuit 553.

Optical signals and noise signals are sequentially output from the pixels of respective columns in the row selected by a selection unit 10 to the output line group 560 on an every four-column basis. The output line group 560 includes a third N output line (seventh output line) 561, fourth S output line (eighth output line) 570, third S output line (ninth output line) 550, and fourth N output line (10th output line) 580.

The third N output line 561 is arranged parallelly adjacent to the fourth S output line 570 on the opposite side of the third S output line 550. A noise signal is output from a third pixel (e.g., the pixel of the third column in the row selected by the selection unit 10) in a pixel array PA to the third N output line 561. The third N output line 561 transmits the noise signal of the third pixel, which is output from a readout unit 20.

The fourth S output line 570 is arranged between the third N output line 561 and the third S output line 550. The fourth S output line 570 is arranged parallelly adjacent to the third S output line 550 on the opposite side of the fourth N output line 580. An optical signal is output from a fourth pixel (e.g., the pixel of the fourth column in the row selected by the selection unit 10) in the pixel array PA to the fourth S output line 570. The fourth S output line 570 transmits the optical signal of the fourth pixel, which is output from the readout unit 20.

The third S output line 550 is arranged between the fourth S output line 570 and the fourth N output line 580. The third S output line 550 is arranged parallelly adjacent to the fourth N output line 580 on the opposite side of the first N output line 220. An optical signal is output from the third pixel in the pixel array PA to the third S output line 550. The third S output line 550 transmits the optical signal of the third pixel, which is output from the readout unit 20.

The fourth N output line 580 is arranged between the first N output line 220 and the third S output line 550. The fourth N output line 580 is arranged parallelly adjacent to the first N output line 220 on the opposite side of the second S output line 230. A noise signal is output from the fourth pixel in the pixel array PA to the fourth N output line 580. The fourth N output line 580 transmits the noise signal of the fourth pixel, which is output from the readout unit 20.

The fourth difference circuit 552 operates the difference between the signal output to the third S output line 550 and that output to the third N output line 561. That is, the fourth difference circuit 552 operates and amplifies the difference between the optical signal from the third S output line 550 and the noise signal from the third N output line 561 to obtain a fourth image signal, and outputs it via an output terminal 190 to the succeeding stage.

The fifth difference circuit 553 operates the difference between the signal output to the fourth S output line 570 and that output to the fourth N output line 580. That is, the fifth difference circuit 553 operates and amplifies the difference between the optical signal from the fourth S output line 570 and the noise signal from the fourth N output line 580 to obtain a fifth image signal, and outputs it via an output terminal 200 to the succeeding stage.

Note that the fourth S output line 570 is arranged between the third S output line 550 and the third N output line 561 to be parallel to them. With this arrangement, noise components attributed to crosstalk inflicted on the third S output line and third N output line by the fourth S output line can be an equal magnitude even when they increase upon decreasing the spacings between the output lines. Hence, the fourth difference circuit 552 can reduce noise attributed to crosstalk in obtaining a fourth image signal.

The third S output line 550 is arranged between the fourth S output line 570 and the fourth N output line 580 to be parallel to them. With this arrangement, noise components attributed to crosstalk inflicted on the fourth S output line and fourth N output line by the third S output line can be an equal magnitude even when they increase upon decreasing the spacings between the output lines. Hence, the fifth difference circuit 553 can reduce noise attributed to crosstalk in obtaining a fifth image signal.

In this manner, noise components attributed to crosstalk inflicted on the third S output line and third N output line by the fourth S output line can be an equal magnitude even when the spacings between the output lines are decreased. Also, noise components attributed to crosstalk inflicted on the fourth S output line and fourth N output line by the third S output line can be an equal magnitude even when the spacings between the output lines are decreased. It is therefore possible not only to reduce noise attributed to crosstalk that the first S output line and second S output line inflict on other output lines, but also to reduce noise attributed to crosstalk that the third S output line and fourth S output line inflict on other output lines even when the spacings between a plurality of output lines are decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-313951, filed Dec. 4, 2007, which is hereby incorporated by reference herein in its entirety.

What is claimed is:

1. An image sensing apparatus comprising:
   a pixel array in which a plurality of pixels including a first pixel and a second pixel are arrayed;
   a readout unit that reads out a signal from the pixel array and outputs a plurality of signals; and
   an output unit including:
      a first output line that transmits an optical signal of the first pixel, that is output from the readout unit, wherein the optical signal of the first pixel is a signal in which a noise signal of the first pixel is superimposed on an image signal of the first pixel,
      a second output line that transmits the noise signal of the first pixel, that is output from the readout unit,
      a third output line that transmits an optical signal of the second pixel, that is output from the readout unit, wherein the optical signal of the second pixel is a signal in which a noise signal of the second pixel is superimposed on an image signal of the second pixel,
      a fourth output line that transmits the noise signal of the second pixel that is output from the readout unit,
      a first difference circuit that operates a difference between the optical signal of the first pixel and the noise signal of the first pixel to generate a first image signal, and
      a second difference circuit that operates a difference between the optical signal of the second pixel and the second signal of the second pixel to generate a second image signal,
   wherein the first output line is arranged between the third output line and the fourth output line, and
   wherein the third output line is arranged between the first output line and the second output line.

2. The apparatus according to claim 1,
   wherein the plurality of pixels further includes a third pixel,
   wherein the output unit further includes:
      a fifth output line that transmits a noise signal of the third pixel, that is output from the readout unit,
      a sixth output line that transmits an optical signal of the third pixel, that is output from the readout unit, wherein the optical signal of the third pixel is a signal in which the noise signal of the third pixel is superimposed on an image signal of the third pixel, and
      a third difference circuit that operates a difference between the first signal of the third pixel and the second signal of the third pixel to generate a third image signal, and
   wherein the fifth output line is arranged between the second output line and the sixth output line.

3. The apparatus according to claim 2, wherein color filters having colors different from each other are provided to the first to third pixels.

4. The apparatus according to claim 1, wherein the apparatus is incorporated in an imaging system comprising:
   an optical system that forms an image on an image sensing plane of the image sensing apparatus; and
   a signal processing unit that processes the signal output from the image sensing apparatus to generate image data.

5. The apparatus according to claim 1, further comprising memories configured to hold the optical signal of the first pixel, the noise signal of first pixel, the optical signal of the second pixel, and the noise signal of the second pixel.

6. The apparatus according to claim 1, wherein a first path through which the optical signal of the first pixel is transmitted intersects with a second path through which the optical signal of the second pixel is transmitted at a number of points and the first path intersects with a third path through which the noise signal of the second pixel is transmitted at the number of points.

7. An image sensing apparatus comprising:
- a pixel array in which a plurality of pixels including a first pixel and a second pixel are arrayed;
- a readout unit that reads out a signal from the pixel array and outputs a plurality of signals; and
- an output unit,
- wherein the output unit includes:
    - a first output line that transmits a first signal of the first pixel that is output from the readout unit,
    - a second output line that transmits a second signal of the first pixel that is output from the readout unit,
    - a third output line that transmits a first signal of the second pixel that is output from the readout unit,
    - a fourth output line that transmits a second signal of the second pixel that is output from the readout unit,
    - a first difference circuit that operates a difference between the first signal and the second signal of the first pixel to generate a first image signal, and
    - a second difference circuit that operates a difference between the first signal and the second signal of the second pixel to generate a second image signal,
- wherein the first output line is arranged between the third output line and the fourth output line,
- wherein the third output line is arranged between the first output line and the second output line, and
- wherein the readout unit includes:
    - a plurality of arithmetic operation units, each of which operates a difference between two signals read out from the pixel of each column of the pixel array, thereby obtaining an image signal of the pixel of each column, and
    - a plurality of amplification units, each of which amplifies the image signal of the pixels of each column, the image signal being output from each of the plurality of arithmetic operation units,
- wherein each of the first signal of the first pixel and the first signal of the second pixel is a signal in which an offset of the amplification unit is superimposed on the image signal, and
- wherein each of the second signal of the first pixel and the second signal of the second pixel is an offset of the amplification unit.

8. The apparatus according to claim 7,
wherein the plurality of pixels further include a third pixel,
wherein the output unit further includes:
- a fifth output line that transmits a noise signal of the third pixel that is output from the readout unit,
- a sixth output line that transmits an optical signal of the third pixel that is output from the readout unit,
    - wherein the optical signal of the third pixel is a signal in which the noise signal of the third pixel is superimposed on an image signal of the third pixel, and
- a third difference circuit that operates a difference between the first signal of the third pixel and the second signal of the third pixel to generate a third image signal, and
wherein the fifth output line is arranged between the second output line and the 9. The apparatus according to claim 8, wherein color filters having colors different from each other are provided to the first to third pixels.

10. The apparatus according to claim 3, wherein the apparatus is incorporated in an imaging system comprising:
- an optical system that forms an image on an image sensing plane of the image sensing apparatus; and
- a signal processing unit that processes the signal output from the image sensing apparatus to generate image data.

11. The apparatus according to claim 3, further comprising memories configured to hold the optical signal of the first pixel, the noise signal of first pixel, the optical signal of the second pixel, and the noise signal of the second pixel.

12. The apparatus according to claim 7, wherein a first path through which the optical signal of the first pixel is transmitted intersects with a second path through which the optical signal of the second pixel is transmitted at a number of points and the first path intersects with a third path through which the noise signal of the second pixel is transmitted at said number of points.

* * * * *